United States Patent
Tarradell et al.

(10) Patent No.: US 10,863,476 B2
(45) Date of Patent: Dec. 8, 2020

(54) APPARATUSES, SYSTEMS, AND METHODS FOR PAGING ENHANCEMENTS FOR LOW COMPLEXITY USER EQUIPMENT

(71) Applicant: Apple Inc., Cupertino, CA (US)

(72) Inventors: Marta Martinez Tarradell, Hillsboro, OR (US); Richard Burbidge, Shrivenham (GB); Youn Hyoung Heo, Seoul (KR); Alexander Sirotkin, Petach Tikva (IL); Puneet Jain, Hillsboro, OR (US); Umesh Phuyal, Beaverton, OR (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/126,560

(22) PCT Filed: Jun. 30, 2015

(86) PCT No.: PCT/US2015/038657
§ 371 (c)(1),
(2) Date: Sep. 15, 2016

(87) PCT Pub. No.: WO2016/004102
PCT Pub. Date: Jan. 7, 2016

(65) Prior Publication Data
US 2017/0086165 A1 Mar. 23, 2017

Related U.S. Application Data

(60) Provisional application No. 62/020,318, filed on Jul. 2, 2014.

(51) Int. Cl.
*H04W 68/00* (2009.01)
*H04W 8/24* (2009.01)
(Continued)

(52) U.S. Cl.
CPC ............ *H04W 68/005* (2013.01); *H04W 4/00* (2013.01); *H04W 4/027* (2013.01); *H04W 4/70* (2018.02);
(Continued)

(58) Field of Classification Search
CPC ......... H04W 4/00; H04W 4/02; H04W 4/027; H04W 4/70; H04W 68/005; H04W 74/0833; H04W 8/24
See application file for complete search history.

(56) References Cited

U.S. PATENT DOCUMENTS

| 9,319,895 B2 | 4/2016 | Siomina et al. |
| 2013/0203415 A1 | 8/2013 | Arvidsson et al. |

(Continued)

FOREIGN PATENT DOCUMENTS

| CN | 101656717 | 2/2010 |
| CN | 102740266 | 10/2012 |

(Continued)

OTHER PUBLICATIONS

Korean Patent Office; Office Action issued for Patent Application No. 10-2016-7033444 dated Apr. 14, 2017; 15 pages.
(Continued)

*Primary Examiner* — Saad A. Waqas
(74) *Attorney, Agent, or Firm* — Fish & Richardson P.C.

(57) ABSTRACT

Embodiments described herein relate generally to techniques for paging in a wireless network. In some embodiments, a mobility management entity (MME) may determine a user equipment (UE) is associated with a predetermined category and adjust paging mechanisms based on said determination. Other embodiments may be described and claimed.

24 Claims, 7 Drawing Sheets

(51) Int. Cl.
  H04W 4/02   (2018.01)
  H04W 4/00   (2018.01)
  H04W 4/70   (2018.01)
  H04W 74/08  (2009.01)
(52) U.S. Cl.
  CPC .......... *H04W 8/24* (2013.01); *H04W 74/0833* (2013.01)

(56) References Cited

U.S. PATENT DOCUMENTS

| | | | | |
|---|---|---|---|---|
| 2014/0254523 | A1* | 9/2014 | Chai ..................... | H04W 72/04 370/329 |
| 2015/0103665 | A1* | 4/2015 | Kaippallimalil ...... | H04W 76/10 370/235 |
| 2015/0327142 | A1 | 11/2015 | Martinez Tarradell et al. | |
| 2016/0073447 | A1* | 3/2016 | Rune ................. | H04W 52/0235 370/311 |

FOREIGN PATENT DOCUMENTS

| | | | |
|---|---|---|---|
| EP | 2903363 | A1 | 8/2015 |
| JP | 2017507584 | | 3/2017 |
| WO | 2014003436 | A1 | 1/2014 |
| WO | WO 2014003436 | | 1/2014 |
| WO | WO 2014020128 | | 2/2014 |
| WO | WO 2014055006 | | 4/2014 |
| WO | 2015065041 | A1 | 5/2015 |
| WO | 2015/113817 | A1 | 8/2015 |

OTHER PUBLICATIONS

Huawei; "Discussion on TBS and bandwidth limitation for MTC UE in Paging," 3GPP TSG RAN WG3 Meeting #83bis R3-140539, San Jose del Cabo, Mexico, Mar. 31-Apr. 4, 2014; Agenda item: 5.1; 2 pages.
3GPP; "Technical Specification Group Radio Access Network; Evolved Universal Terrestrial Radio Access (E-UTRA); Radio Resource Control (RRC); Protocol specification (Release 12)," TS 36.331 V12.1.0 (Mar. 2014); 356 pages.
Notice of Reasons for Rejection dated Dec. 6, 2017 from Japanese Patent Application No. 2016-570302, 6 pages.
Ericsson, "Handling of low complexity UE categories during handover," 3GPP TSG-RAN WG2 #86, Tdoc R2-142120, Agenda Item: 7.7, May 19-23, 2014, Seoul, South Korea, 4 pages.
Mediatek Inc, "Impacts of low-cost MTC on RAN2," 3GPP TSG-RAN2 #85bis Meeting, R2-141434, Agenda Item: 7.7, Mar. 31-Apr. 4, 2014, Valencia, Spain, 4 pages.
Korean Patent Office; Last Notice of Preliminary Rejection issued for Patent Application No. 10-2016-70334, dated Nov. 21, 2017; 16 pages.
International Search Report and Written Opinion for PCT/US2015/038657 dated Jan. 20, 2016; 28 pages.
Vodafone, Intel, Catt,ZTE, Media Tek, Sierra Wireless; "Proposals on open aspects in low complexity UE specification," 3GPP TSG RAN WG2 Meeting #87 R2-143575; Agenda Item: 7.6; Dresden, Germany, Aug. 18-22, 2014; 4 pages.
Ericsson, Alcatel-Lucent, Interdigital, Huawei, Hisilicon, Sony, Vodafone, Catt; "Introduction of signaling support for low complexity UEs," 3GPP TSG-RAN WG2 Meeting #87 R2-143977; Dresden, Germany, Aug. 18-22, 2014; 22 pages.
Alcatel-Lucent, Alcatel-Lucent Shanghai Bell; "eNB knowledge of low-complexity UE," 3GPP TSG-RAN WG2 Meeting #87 R2-143587; Agenda Item: 7.6; Dresden, Germany, Aug. 18-22, 2014; 6 pages.
Alcatel-Lucent; "Transfer of Paging Category," 3GPP TSG-RAN WG3 Meeting #85 R3-141715; Dresden, Germany, Aug. 18-22, 2014; 18 pages.
3GPP; Technical Specification Group Services and System Aspects; General Packet Radio Service (GPRS) enhancements for Evolved Universal Terrestrial Radio Access Network (E-UTRAN) access (Release 12); 3GPP TS 23.401 V12.5.0 (Jun. 2014); 306 pages.
Huawei, Hisilicon; "Optimizations on paging for low cost MTC," 3GPP TSG.RAN WG2 #86 R2-142079; Agenda Item: 7.7.2; Seoul, Korea, May 19-23, 2014; 2 pages.
Ericsson; "Paging mechanism for low cost UEs," 3GPP TSG-RAN WG2 #85bis Tdoc R2-1 41304; Agenda Item: 7.7; Valencia, Spain, Mar. 31-Apr. 4, 2014; 4 pages.
3GPP; Technical Specification Group Radio Access Network; Evolved Universal Terrestrial Radio Access Network (E-UTRAN); 51 Application Protocol (S1AP) (Release 12); 3GPP TS 36 .413 V12.2.0 (Jun. 2014); 286 pages.
Sony; "Low-cost capability Issues," 3GPP TSG-RAN WG2 Meeting #85 R2-14036; Agenda Item: 7.9.1; Prague, Czech Republic, Feb. 10-14, 2014; 4 pages.
3GPP; Technical Specification Group Services and System Aspects; Study on security aspects of Machine-Type Communications (MTC) and other mobile data applications communications enhancements (Release 12); 3GPP TR 33.868 V12.1.0 (Jun. 2014); 116 pages.
Huawei, Hisilicon; "Capability report for low cost MTC UEs," 3GPP TSG.RAN WG2 #86 R2-142070; Agenda Item: 7.7.2; Seoul, Korea, May 19-23, 2014; 4 pages.
LG Electronics Inc.; "Impacts due to narrow bandwidth characteristic of low cost MTC UE," 3GPP TSG-RAN2 Meeting #84 R2-134371; Agenda Item: 7.9.1; San Francisco, USA, Nov. 11-15, 2013; 4 pages.
3GPP, "Technical Specification Group Radio Access Network; Evolved Universal Terrestrial Radio Access (E-UTRA); User Equipment (UE) radio access capabilities (Release 12)," 3GPP TS 36.306 V12.0.0 (Mar. 2014), Lte Advanced, 29 pages.
Korean Patent Office—Notice of Final Rejection dated Jul. 30, 2018 from Korean Patent Application No. 10-2016-7033444, 8 pages.
Huawei, "Introduction of Category 0 for Low Cost MTC," 3GPP TSG-RAN WG2 #85, R2-140286, Change Request, 36.306, CR CRNum, Current version: 11.5.0, Feb. 10-14, 2014, Prague, Czech Republic, 3 pages.
European Patent Office—Article 94(3) dated Jan. 28, 2019 from European Patent Application No. 15738217.7, 10 pages.
3GPP, "Considerations on some low complexity aspects," TSG-RAN WG2 Meeting #85bis R2-141499, Valencia, Spain, Mar. 31-Apr. 4, 2014, 4 pages.
3GPP, "On remaining details for the new Low Cost UE category," Meeting #74bis, Guangzhou, China, Oct. 7-11, 2013, R1-134558, 7.2.2.1, 4 pages.
Ericson, "Introduction of category handling for low complexity UEs," 3GPP TSG-RAN WG2 Meeting #86, R2-142121, V12.1.0, May 19-23, 2014, Seoul, South Korea, pp. 1-13.
PCT International Preliminary Report on Patentability Chapter II in International Appln. PCT/US2015/038657, dated Jun. 28, 2016, 14 pages.

* cited by examiner

APPARATUSES, SYSTEMS, AND METHODS FOR PAGING ENHANCEMENTS FOR LOW COMPLEXITY USER EQUIPMENT

CROSS REFERENCE TO RELATED APPLICATIONS

The present application is a national phase entry under 35 U.S.C. § 371 of International Application No. PCT/US2015/038657, filed Jun. 30, 2015, entitled "APPARATUSES, SYSTEMS, AND METHODS FOR PAGING ENHANCEMENTS FOR LOW COMPLEXITY USER EQUIPMENT", which claims priority to U.S. Provisional Application No. 62/020,318 entitled "LTE ENHANCEMENTS ON PAGING MECHANISM FOR LOW COMPLEXITY UES" filed on Jul. 2, 2014, which are hereby incorporated by reference in their entireties.

FIELD

Embodiments of the present invention relate generally to the technical field of data processing, and more particularly, to techniques for paging in wireless communication networks.

BACKGROUND

Paging procedures are used by a network in order to contact idle mode user equipments (UEs) and request that they initiate the establishment of a radio resource control (RRC) connection. A paging procedure may be used when data for a UE arrives in a network. The network may not know the cell in which the UE is located, but only that the UE may be anywhere within its registered tracking areas (TAs). Therefore, the network will send a paging message from all cells of the registered TAs in order to ensure that the UE may be reached. The paging procedure may be initiated by a mobility management entity (MME), which sends paging messages to appropriate evolved Node Bs (eNBs) via an S1 interface using an S1 application protocol. These may be referred to as S1-AP paging messages. Each eNB may then send paging messages via an air interface using an RRC protocol. These may be referred to as air interface paging messages or RRC paging messages.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they may mean at least one.

DETAILED DESCRIPTION

In the following detailed description, reference is made to the accompanying drawings, which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A or B" means (A), (B), or (A and B). Thus, "or" is an inclusive disjunction.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality.

Figure 1:
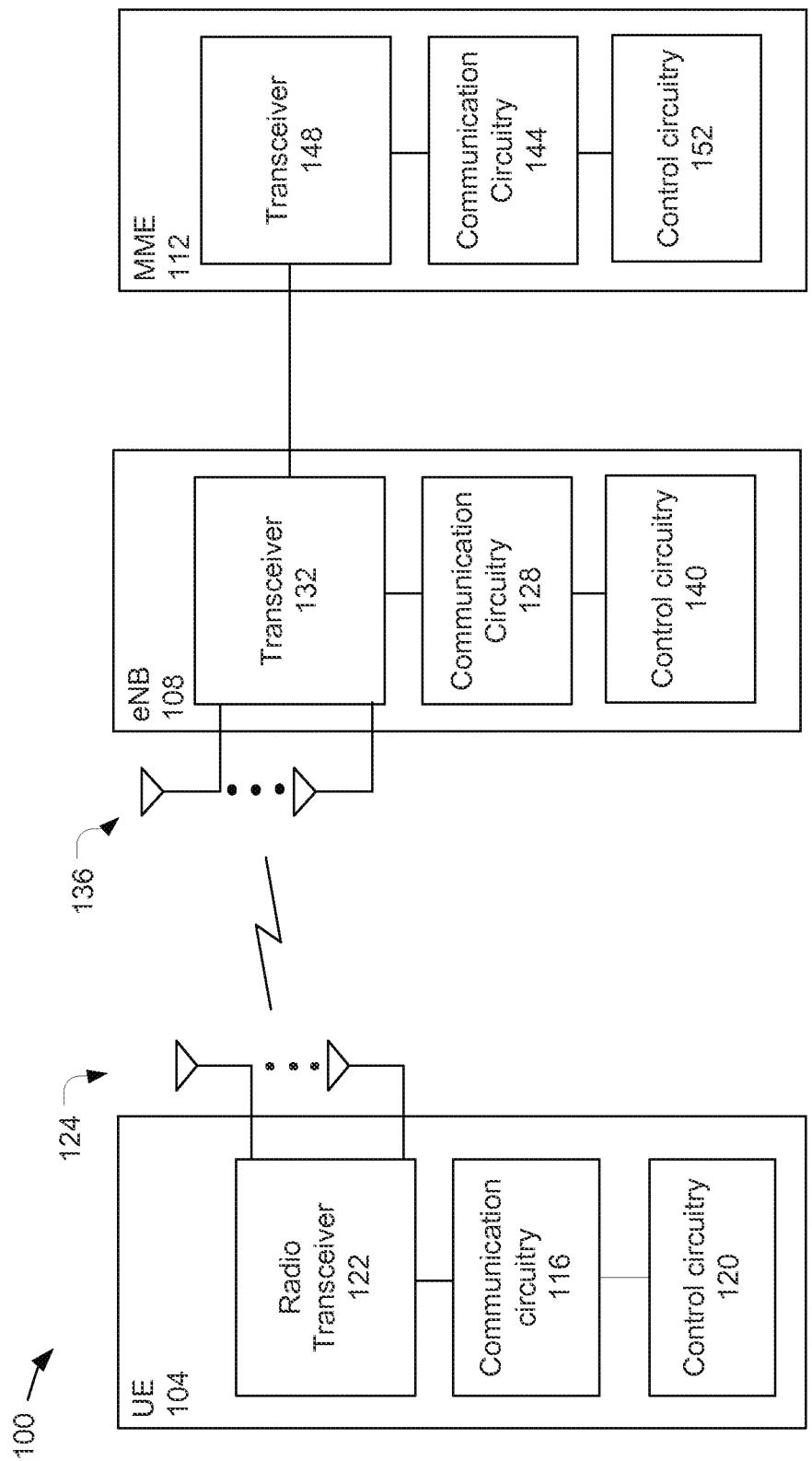
FIG. 1 is a block diagram showing a wireless communication environment including a user equipment, an evolved Node B, and a mobility management entity, in accordance with various embodiments.

FIG. 1 schematically illustrates a wireless communication environment 100 in accordance with various embodiments. The environment 100 may include a UE 104, an eNB 108, and an MME 112.

The eNB 108 may be an access node of a 3rd Generation Partnership Project (3GPP) long-term evolution (LTE) network (or an LTE-Advanced (LTE-A) network). In particular, the eNB 108 may be part of a radio access network (RAN) of the LTE/LTE-A network, such as an evolved universal terrestrial radio access network (E-UTRAN). While embodiments of the present disclosure are described with respect to LTE networks, similar concepts may also be applicable to other networks, for example, universal mobile telecommunications system (UMTS) networks, global system for mobile communications (GSM) networks, etc.

The E-UTRAN may be coupled with components of a core network, for example, an Evolved Packet Core (EPC) that performs various management and control functions of the LTE/LTE-A network and further provides a communication interface between various RANs and other networks. The MME 112 may reside in the core network.

The UE 104 may be any type of computing device equipped with wireless communication circuitry and adapted to communicate through a RAN according to, for example, one or more 3GPP Technical Specifications. The UE 104 may include, but is not limited to, a phone, a computer, a sensor, or any other device that is configured for wireless communication through a RAN. The UE 104 may include communication circuitry 116, control circuitry 120, radio transceiver 122, and one or more antennas 124.

Communication circuitry 116 may interface with the radio transceiver 122 to receive radio frequency (RF) signals from and/or send RF signals to one or more components, for example, eNB 108, over an air interface via the one or more antennas 124. The air interface between the UE 104 and the eNB 108 may be referred to as a Uu interface in 3GPP Technical Specifications. In various embodiments, the communication circuitry 116 may use E-UTRA protocols for communications over the air interface. The communication circuitry 116 may use orthogonal frequency division multiple access (OFDMA) for downlink communications and single carrier-frequency division multiple access (SC-FDMA) for uplink communications on the Uu interface.

The communication circuitry 116 may include signal-construction circuitry including, but not limited to, an encoder to encode input data, and a modulator to modulate a carrier signal to include the encoded input data to be transmitted. The communication circuitry 116 may further include signal-deconstruction circuitry including, but not limited to, a demodulator to provide encoded data from a modulated carrier signal, and a decoder to provide data from encoded data.

The radio transceiver 122 may provide for the transmission and reception of the RF signals. The radio transceiver 122 may have RF transmit circuitry such as, but not limited to, an up-converter to convert baseband signals to radio-frequency signals, and a power amplifier (PA) to amplify the (RF) signals for transmission. The radio transceiver 122 may further have RF receive circuitry such as, but not limited to, a low-noise amplifier to amplify a received RF signal, a filter to filter a received RF signal, and a downconverter to convert an RF signal to a baseband signal.

The control circuitry 120 may be coupled to communication circuitry 116, and may be configured to perform higher layer operations, for example, operations at layers in a communication protocol stack that are higher than layers of the communication protocol stack that perform the operations of the communication circuitry 116 for the radio transceiver 122. In general, control circuitry 120 may further be configured to perform paging and configuration operations as described with respect to various embodiments.

In some embodiments, the communication circuitry 116 and the control circuitry 120 may, collectively, provide the majority or all of the operations related to the communication protocol stack. The communication circuitry 116 and the control circuitry 120 may include, or be a part of, baseband circuitry (for example, a baseband chipset), a PC card, a connect card, a mobile broadband modem, etc.

The eNB 108 may include communication circuitry 128 to interface with transceiver 132 to communicate over the air interface to, for example, receive uplink RF signals from UE 104 via one or more antennas 136 and transmit downlink RF signals to UE 104 via the one or more antennas 136. In some embodiments, the communication circuitry 128 may have signal-construction circuitry and signal-deconstruction circuitry that complement the corresponding circuitry in communication circuitry 116. Similarly, the transceiver 132 may include RF transmit circuitry and RF receive circuitry that complement the corresponding circuitry in radio transceiver 122.

The eNB 108 may also include control circuitry 140 coupled with communication circuitry 128. The control circuitry 140 may be configured to perform higher layer operations to control aspects of wireless communications in the cell provided by the eNB 108. For example, the control circuitry 140 may perform paging and configuration operations as described with respect to various embodiments.

In addition to communication over the air interface, the components of the eNB 108, including the communication circuitry 128, transceiver 132, and control circuitry 140, may include circuitry to communicate over one or more additional wired or wireless interfaces. For example, the components of the eNB 108 may communicate over an S1-MME interface with the MME 112 for control plane traffic. The eNB 108 may use an S1-AP protocol on the S1-MME interface. In some embodiments, the transceiver 132 may include an Ethernet interface to support S1-AP signaling over Ethernet networks such as, but not limited to, fiber-optic gigabit and 10 Gigabit Ethernet, to provide the S1-MME interface.

The MME 112 may include communication circuitry 144 to interface with transceiver 148 to communicate over the S1-MME interface to, for example, receive S1-AP transmissions from the eNB 108 or transmit S1-AP transmissions to the eNB 108 over the S1-MME interface. The transceiver 148 may include an Ethernet interface to support the S1-AP signaling over Ethernet networks.

The MME 112 may also include control circuitry 152 coupled with the communication circuitry 144. The control circuitry 152 may be configured to perform higher layer operations to control communications in the E-UTRAN from the EPC. Of particular relevance to the present disclosure, the control circuitry 152 may be responsible for paging of idle mode UEs. In general, control circuitry 152 may further be configured to perform any portion of the paging or configuration processes described herein.

To facilitate management of a large number of different UEs, each being associated with different traffic patterns, communication requirements, etc., categories of UEs may be defined. Each category may be associated with certain data rates and features supported by UEs within the category. In general, higher-numbered categories may support higher data rates and more features. As a result, the higher-numbered categories may also be higher-cost UEs to provide the desired processing power and memory. A low cost, low complexity UE category may be provided for machine type communication (MTC) UEs that require only very low data rates. This category may be referred to as category 0. One aspect of the category-0 UEs is that they may only require a single receive antenna, in contrast to all other UE categories that may require at least two receive antennas. This single receive antenna may result in increased error probability for the receipt of paging messages. If, when the eNB transmits a paging message, it could know that the message is intended for a category-0 UE then the eNB could, for example, use an increased transmit power or higher coding rate for the transmission in order to compensate for the single receive antenna. This could provide a similar error probability to paging messages sent to other category UEs. Some updates to the S1-AP Paging message would be needed to inform the eNB that a paging is for a category-0 UE for this purpose.

In some embodiments, category-0 UEs may only be able to access eNBs that have been specifically designed to support category-0 UEs. Cells of such eNBs may broadcast a category-0 support indicator. Category-0 UEs may be restricted to only camping on and attempting to access cells that broadcast this support indicator. Note that it is possible for some cells controlled by an eNB to support category-0 UEs, while other cells controlled by the eNB do not. This would be an operator deployment decision but it could occur if an operator only wanted to support category 0 on a single or limited set of carrier frequencies.

Embodiments described herein provide paging architectures and processes that may be used in the wireless communication environment 100 to provide efficient paging of category-0 UEs. While embodiments are described with respect to category-0 UEs, similar processes may be expanded and applied to other cases such as other UE categories or UEs sharing a certain feature or service category/class. These other types of UEs may include, for example, UEs that require special handling when they are paged, UEs that are unable to camp on certain cells of a network, UEs that support small data or a specific service type, UEs operating on reduced bandwidths, UEs using enhanced coverage, etc. As used herein, UEs of a predetermined category of UEs may refer to any UEs that have common traits, characteristics, operating modes, etc. For purposes of the present description, a "category-A UE" may be a UE that is associated with any type of predetermined category including, but not limited to, category 0.

FIGS. 2-6 illustrate methods that may be performed to reduce a paging load over an S1-MME interface or an air interface if particular cells do not support or do not have any current connections with category-A UEs.

Figure 2:
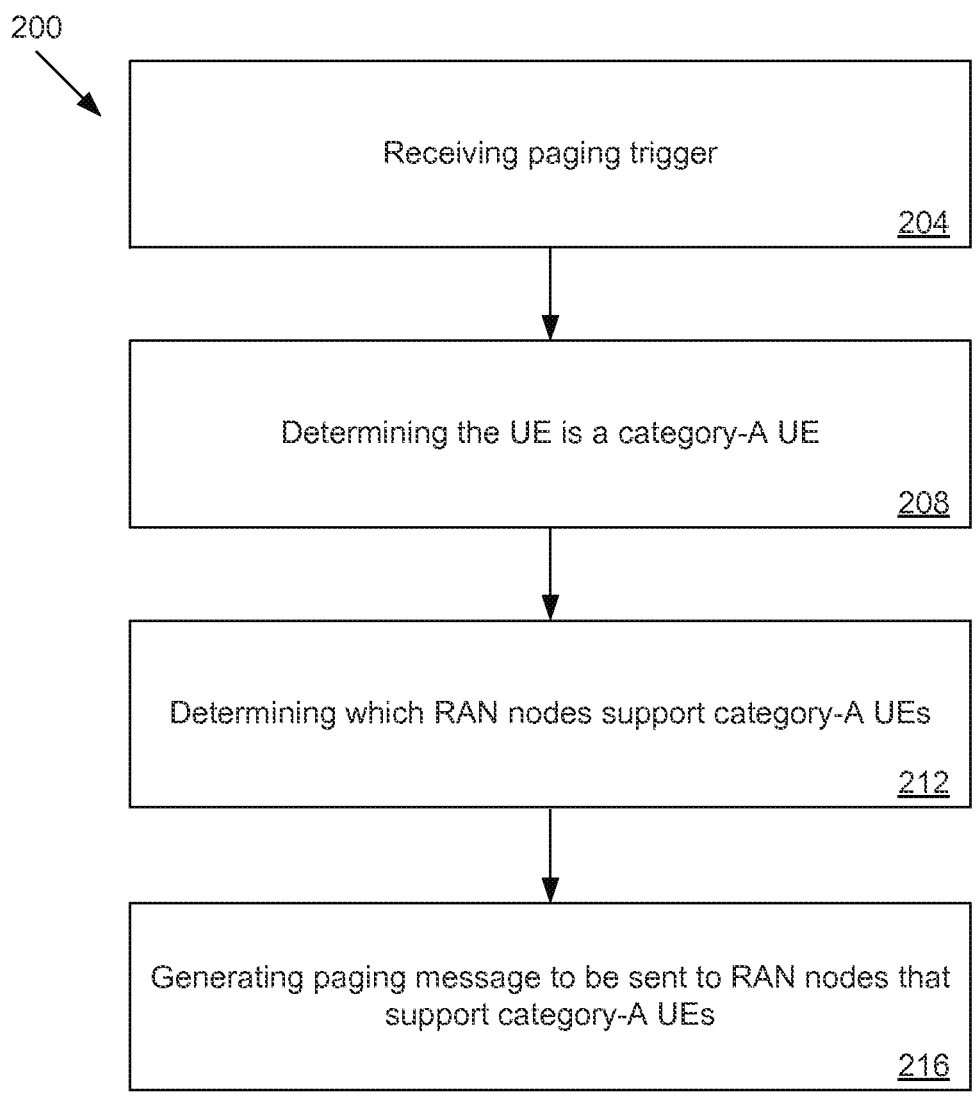
FIG. 2 is a flow diagram illustrating a method for paging in accordance with various embodiments.

FIG. 2 is a flowchart illustrating a method 200 for paging in accordance with various embodiments. In some embodiments, the method 200 may be performed by the MME 112, and, in particular, control circuitry 152. In some embodiments, the control circuitry 152 may include one or more non-transitory computer-readable media having instructions, stored thereon, that when executed cause the MME 112 to perform the method 200.

At 204, the method 200 may include receiving a paging trigger. The paging trigger may indicate the network has data that is to be transmitted to a particular UE, for example, UE 104. In some embodiments, the paging trigger may result from a serving gateway indicating that it has downlink information for the UE 104.

At 208, the method 200 may include determining the UE to be paged is a category-A UE.

In some embodiments, the MME 112 may determine that the UE is a category-A UE by accessing a category indicator stored in a UE radio access capability structure. The UE radio access capability structure, which may be an information element (IE) that includes information about radio capabilities of the UE, is typically stored within the MME 112 when the UE 104 is an idle mode. The MME 112 may provide the UE radio access capability structure to the eNB 108 when the UE 104 transitions from the idle mode to a connected mode.

In present systems, the UE radio capability structure is stored at the MME in a transparent manner within a UE context. Thus, an MME would not interpret or otherwise use information from the UE radio access capability structure. However, in the present embodiment, the MME 112 may access the category indicator in the UE radio access capability structure to determine whether the UE is a category-A UE.

In some embodiments, the MME 112 may determine that the UE is a category-A UE by accessing a paging IE, which includes the category indicator and is stored separately from the UE radio access capability structure at the MME 112. In these embodiments, the UE radio access capability structure, which may also include a category indicator, may still be stored transparently within the UE context in the MME 112. However, the MME 112 will read the category indicator from the separately stored paging IE, rather than from the UE radio access capability structure.

The paging IE may be transmitted to the MME 112 from the UE 104 in a number of different ways. For example, the paging IE may be transmitted in a non-access stratum (NAS) message sent to the MME 112. The NAS message may be, but is not limited to, an attach request, a service request, a tracking area update (TAU)/routing area update (RAU), etc. The NAS message may be forwarded by the eNB 108 to the MME 112, but not interpreted by the eNB 108. The paging IE may be transmitted to the MME 112 in the same message that transmits the UE radio access capability structure, or in a different message.

In some embodiments, the MME 112 may determine that the UE is a category-A UE by accessing the category indicator in UE subscription data stored in a home subscriber server (HSS), a home location register (HLR), or an authentication, accounting, and authorization (AAA) server.

In some embodiments, the MME 112 may download the UE subscription data, along with the capability indicator, from the HSS/HLR/AAA as part of an insert subscription data operation during an ATTACH/TAU procedure. This UE subscription data may also be sent to the MME 112 from another MME during an inter-MME relocation/handover. This approach ties the subscription and the device capabilities together, which could have some implications. For example, if a universal subscriber identity module (USIM) was placed into a UE of a different UE category, then the network, which may get the capability indicator from the UE subscription data, may continue to treat this UE as a category-A UE. However, it is not expected that the USIM will be removed from the MTC device very frequently—and in some cases the USIM may not even be removable.

In some embodiments, the category indicator may be sent to the eNB 108 from the UE 104 in a random access channel (RACH) or radio resource control (RRC) message. For example, the category indicator may be sent in an RRC connection request message, an RRC connection setup complete message, an RRC connection reconfiguration message, a UE capability information message, etc. Embodiments in which the indication is transmitted through the UE capability information message may include the embodiment in which the MME 112 accesses the capability indicator in the UE radio access capability structure to determine whether the UE is a category-A UE.

In embodiments in which the category indicator is sent to the eNB 108 in a RACH or RRC message, the eNB 108 may generate a message to be transmitted to the MME 112 of the S1-AP interface. The eNB 108 may add the indication in, for example, an indication IE in a current S1-AP (for example, an initial UE message) or may create a new message to carry the indication IE. The indication IE in the S1-AP message transmitted to the MME 112 may be external to the UE radio access capability structure that may also be provided to the MME 112 and may also contain a, duplicate, category indicator.

As discussed above, the category indicator discussed herein could additionally/alternatively characterize UEs that belong to a certain group, category, or class. For example, a category indicator may be used to differentiate UEs that might belong to a certain service category class. Additionally, this indication may be used to indicate the usage of different configuration settings or timers, for example, for the paging retransmission or for different periodic TAU timers or timers that control when to unregister the UE from the network.

At 212, the method 200 may include determining which RAN nodes, of all the RAN nodes within a registered tracking area, support category-A UEs. The RAN nodes may be the eNBs or other RAN nodes that provide cells within a network. The MME 112 may determine which RAN nodes support category-A UEs in a number of different ways.

In some embodiments, the MME 112 may be pre-provisioned with information regarding whether eNBs support category-A UEs. For example, the MME 112 may be pre-provisioned through a standard operations and management (O&M) configuration or through proprietary vendor-specific methods. This embodiment may be more static and could add complexity on planning for operators/networks.

Alternatively, a pre-configured network database can be set up to store the information of all eNBs that support category-A UEs. The MME 112 could query the network database for the desired information on an as-needed or other basis. The database information may be updated upon addition, modification, or deletion of nodes. The operator may also maintain a database, for example, in an operations, administration, and management (OAM) system, of eNBs supporting category-A UEs. In some embodiments, an eNB's category-A support may be semi-static and may, for example, vary with time of day or other factors. The database may include information about when and to what extent an eNB may provide category-A support.

In some embodiments, the MME 112 may receive category-A support information through S1-AP signaling messages exchanged with the eNB 108. The MME 112 may send a specific query to the eNB 108 to request the category-A support information or the eNB 108 may proactively transmit the information upon the occurrence of certain conditions.

In some embodiments, the category-A support information may be static configuration information that will not change. In other embodiments, the category-A support may change dynamically over time. For example, the eNB 108 may decide to drop or otherwise limit category-A support under congestion situations. In these embodiments, the S1-AP messages may be used to convey this information at appropriate times, for example, after each change in category-A support.

The category-A support information may be transmitted from the eNB 108 in a new class 1 S1-AP message or an existing S1-AP message that may be enhanced to include the query and response. S1-AP messages that could be enhanced to carry the category-A support indication include, but are not limited to, an S1-AP eNB configuration update message, an S1-AP Setup message, an S1-AP UPLINK NAS TRANSPORT message, an S1-AP INITIAL UE message, and an S1-AP UE CAPABILITY INFO message. In some embodiments, the category-A support indication may be piggy-backed as part of a UE associated signaling message.

In some embodiments, in addition (or as an alternative) to providing the MME 112 with a category-A support indication, the eNB 108 may provide the MME 112 with information as to which category-A UEs are currently connected with the eNB 108. This information may be provided in a connection report that is periodically transmitted to the MME 112 or transmitted upon the occurrence of some predetermined trigger, for example, when connections are initiated or terminated.

In some embodiments, eNBs associated with predetermined tracking areas or cells may be configured to transmit a camping indication to the MME 112 when a designated UE, for example, UE 104, camps on the predetermined tracking areas or cells. Providing an indication when a UE is camped on a particular cell may be particularly useful for category-A UEs, as such UEs might not change their physical location over their life period (for example, sensors, smart metering, etc.) or their mobility might be very low or within a known area.

In some embodiments there might be two different parameters to indicate separately the support/no support of category-A UEs (understood as a feature that could have enabled or disabled based on eNB implementation or deployment) vs the access allowed/not allowed (understood as information that may change over time due to certain network decisions). For example, a first indication may be used to indicate whether a cell supports category A (which may be static, but optional information that may be included in MIB or SIB1), while a second indication may be changed dynamically to control access of these UEs. For example, the second indication may be used if the cell does not allow certain UEs to access the cell at a certain time. In some embodiments, the second indication might indicate that category-A UEs trying to get connected to a cell at a certain time may not do so (while category-A UEs currently in idle mode would still be allowed). The mechanisms described above also apply in this case.

In some embodiments, the MME 112 may distribute information about which RAN nodes support category-A UEs, for example, eNB 108, to other nodes in the core network or RAN. For example, the MME 112 may transmit category-A support information to one or more eNBs that are neighbors to, or otherwise nearby, the eNB 108. The category-A supporting information may include, but is not limited to, eNB ID, cell ID, and carrier frequency ID. In various embodiments, the category-A support information may be distributed through a number of different ways. For example, neighbor eNBs may be preconfigured through, for example, O&M configuration or an internal initial configuration, with the category-A support information. The category-A support information may be distributed by transmission of new S1-AP messages, transmission of existing S1-AP messages enhanced to carry an IE that provide the category-support information, or transmitted in UE-associated signaling messages.

At 216, the method 200 may include transmitting paging messages to the RAN nodes that were determined to support category-0 UEs. The paging messages transmitted at 216 may be S1-AP paging messages. Because S1-AP paging messages are not sent to the RAN nodes that were determined to not support category-0 UEs, the method 200 may reduce both paging messages sent over the S1 interface as well as reducing a number of paging messages sent over the radio interface in the cells of the RAN nodes that do not support category-A UEs.

The MME 112 may further restrict the RAN nodes to which the S1-AP paging messages are sent if the MME 112 has received information about which UEs are camped on particular cells. In these embodiments, the S1-AP paging message may only be sent to the eNB associated with the cell in which the UE is camped.

The RAN nodes that receive the S1-AP paging messages transmitted at 212 may broadcast paging messages in their respective cells.

Figure 3:
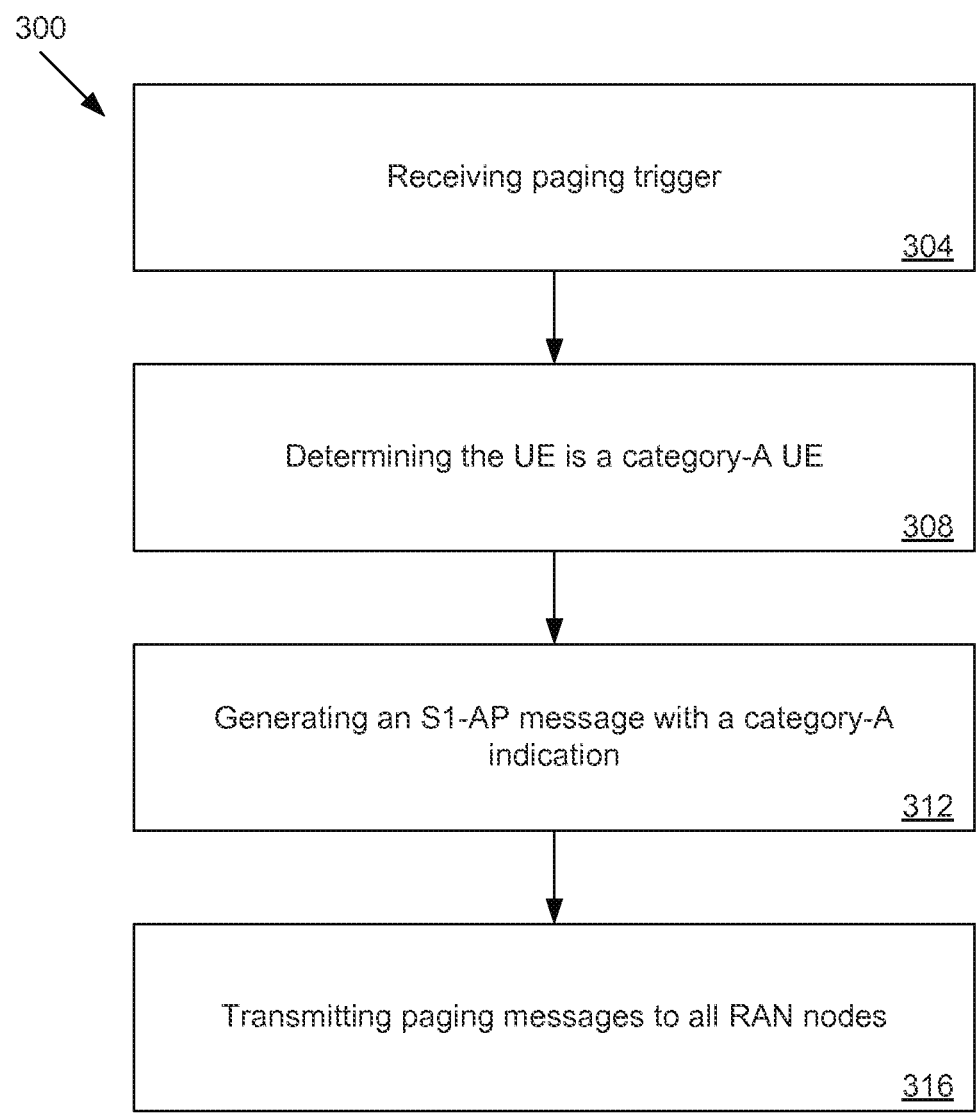
FIG. 3 is a flow diagram illustrating another method for paging in accordance with various embodiments.

FIG. 3 is a flowchart illustrating a method 300 for paging in accordance with various embodiments. In some embodiments, the method 300 may be performed by the MME 112 and, in particular, control circuitry 152. In some embodiments, the control circuitry 152 may include one or more non-transitory computer-readable media having instructions, stored thereon, that when executed cause the MME 112 to perform the method 300.

At 304, the method 300 may include receiving a paging trigger. The receiving of the paging trigger may be similar to that described above with respect to 204.

At 308, the method 300 may include determining that the UE to be paged is a category-A UE. The determining that the UE to be paged is a category-A UE may be similar to that described above with respect to 208.

At 312, the method 300 may include generating an S1-AP paging message with an indication that the S1-AP paging message is directed to a category-0 UE. This indication may be referred to as a category-A indication. In some embodiments, the category-A indication may be included in an information element in a current S1-AP paging message. Tables 1 and 2 below illustrate contents of an S1-AP paging message, which may be used to page a category-A UE in one or several tracking areas, that is enhanced to include the category-A indication (shown in Table 1 as "Cat A," but may also be "Cat 0" in embodiments in which the UE is a category-0 UE). The terms in Tables 1 and 2 may be defined consistently with corresponding descriptions in 3GPP TS 36.413 v12.2.0 (2014 Jun. 27).

the MME 112 to the eNB 108, the indication that the paging target is a category-A UE may be conveyed in additional/alternative ways. For example, in some embodiments, certain core network nodes, for example, MME 112, may be dedicated to servicing category-A UEs. In this embodiment, the eNB 108 may interpret any paging message from the MME 112 as a paging message for a category-A UE.

In some embodiments, certain RAN nodes, for example, eNB 108, may be dedicated to servicing category-A UEs. The MME 112, having this information, may only transmit paging messages directed to category-A UEs to the eNB 108. Therefore, the eNB 108 may interpret any received paging message as a paging message for a category-A UE.

In addition to category-A dedicated eNBs or MMEs, the dedicated network nodes could additionally/alternatively be any node that allows an origin user device to communicate with a destination, for example, hub nodes, or a simplified eNB or UE node that could route the data to the destination.

Figure 4:
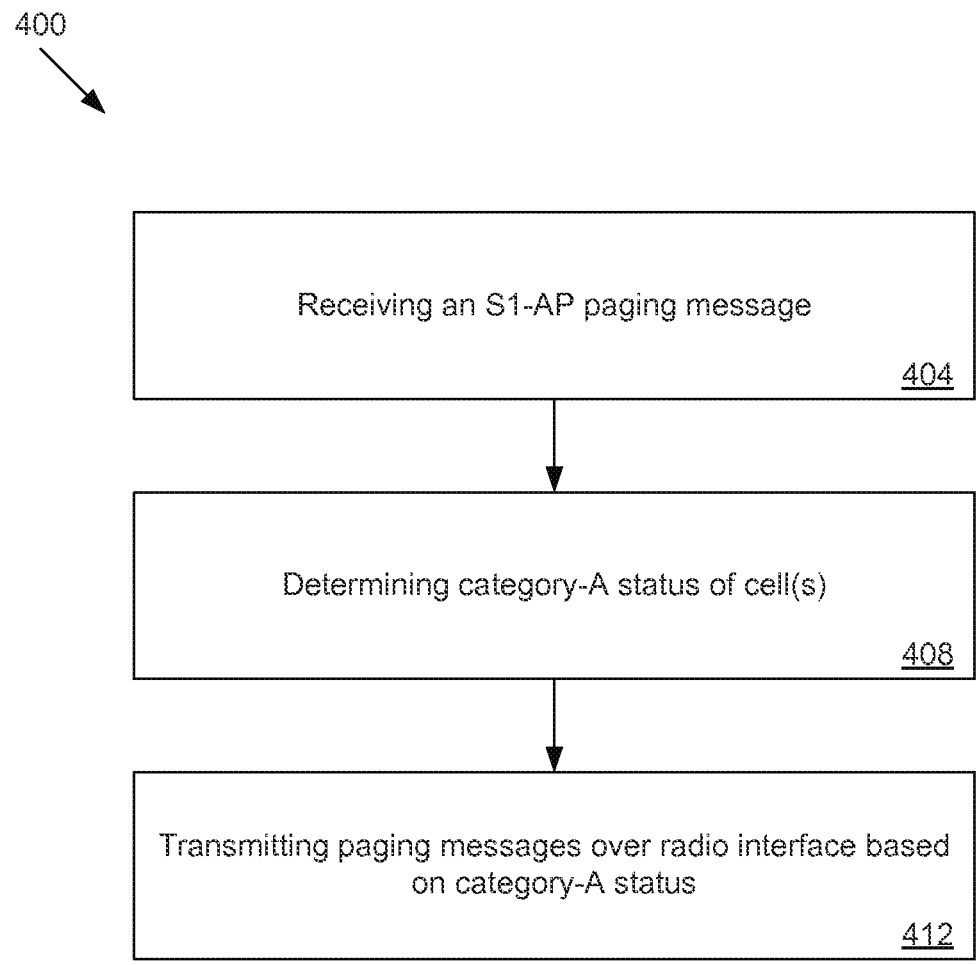
FIG. 4 is a flow diagram illustrating another method for paging in accordance with various embodiments.

FIG. 4 is a flowchart illustrating a method 400 for paging in accordance with various embodiments. In some embodiments, the method 400 may be performed by a RAN node, for example, the eNB 108 and, in particular, control circuitry 140. In some embodiments, the control circuitry 140 may include one or more non-transitory computer-readable

TABLE 1

| IE/Group Name | Presence | Range | IE Type and Reference | Semantics Description | Criticality | Assigned Criticality |
|---|---|---|---|---|---|---|
| Message Type | M | | 9.2.1.1 | | YES | ignore |
| UE Identity Index Value | M | | 9.2.3.10 | | YES | ignore |
| UE Paging Identity | M | | 9.2.3.13 | | YES | ignore |
| Paging DRX | O | | 9.2.1.16 | | YES | ignore |
| CN Domain | M | | 9.2.3.22 | | YES | ignore |
| List of TAIs | | 1 | | | YES | ignore |
| >TAI List Item | | 1 ... <maxnoofTAIs> | | | EACH | ignore |
| >>TAI | M | | 9.2.3.16 | | — | |
| CSG Id List | | 0 ... 1 | | | GLOBAL | ignore |
| >CSG Id | | 1 ... <maxnoofCSGId> | 9.2.1.62 | | — | |
| Paging Priority | O | | 9.2.1.78 | | YES | ignore |
| Cat A | O | | | | YES | ignore |

TABLE 2

| Range Bound | Explanation |
|---|---|
| maxnoofTAIs | Maximum no. of TAIs. Value is 256. |
| maxnoofCSGIds | Maximum no. of CSG Ids within the CSG Id List. Value is 256. |

In other embodiments, the category-A indication may be included in an IE or other structure transmitted in a newly defined S1-AP message.

In some embodiments, 308 may be omitted and the MME may not need to determine that the paging target is a category-A UE. In these embodiments, the MME may receive an IE that includes the category-A indication from another entity and the MME may incorporate the IE into the generated S1-AP message without interpreting the contents of the IE itself.

At 316, the method 300 may include transmitting paging messages to all the RAN nodes within a registered tracking area. The S1-AP paging messages may be sent to all the RAN nodes within a registered tracking area, regardless of whether the RAN nodes support category-A UEs.

While the method 300 describes transmitting a category-A indication in an S1-AP message transmitted from media having instructions, stored thereon, that when executed cause the eNB 108 to perform the method 400.

At 404, the method 400 may include receiving an S1-AP paging message. The S1-AP paging message may be similar to the paging message transmitted by the MME 112 at 312 of method 300. The S1-AP paging message may include a category-A indication.

At 408, the method 400 may include determining a category-A status of each of the cells provided by the eNB 108. In some embodiments, a category-A status may be a positive page status or a negative page status. In some embodiments, a cell may have a positive page status if the cell supports category-A UEs regardless of whether a category-A UE is currently camped in the cell. In other embodiments, a cell may have a positive page status only if the cell supports category-A UEs and a category-A UE is currently in the cell.

At 412, the method 400 may include transmitting paging messages over radio interface based on category-A status. For example, the eNB 108 may transmit paging messages over radio interfaces on each of its cells that has a positive page status.

Figure 5:
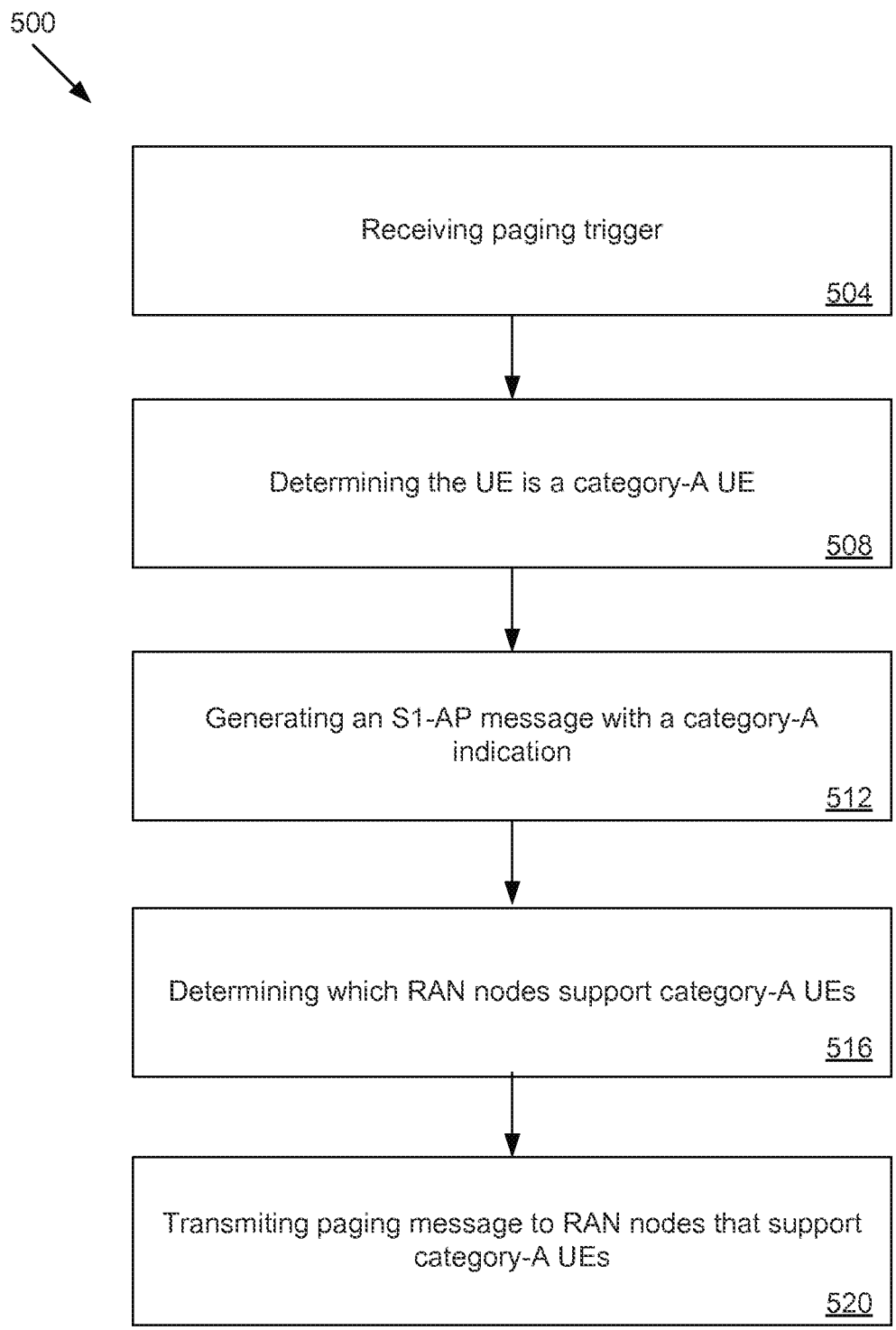
FIG. 5 is a flow diagram illustrating another method for paging in accordance with various embodiments.

FIG. 5 is a flowchart illustrating a method 500 for paging in accordance with various embodiments. In some embodiments, the method 500 may be performed by the MME 112 and, in particular, control circuitry 152. In some embodiments, the control circuitry 152 may include one or more non-transitory computer-readable media having instructions, stored thereon, that when executed cause the MME 112 to perform the method 500.

At 504, the method 500 may include receiving a paging trigger. The receiving of the paging trigger may be similar to that described above with respect to 204.

At 508, the method 500 may include determining that the UE to be paged is a category-A UE. The determining that the UE to be paged is a category-A UE may be similar to that described above with respect to 208.

At 512, the method 500 may include generating an S1-AP paging message with a category-A indication to indicate that the S1-AP paging message is directed to a category-0 UE. The generating of the S1-AP paging message with a category-A indication may be similar to that described above with respect to 312.

At 516, the method 500 may include determining which RAN nodes, of all the RAN nodes within a registered tracking area, support category-A UEs. The determining which RAN nodes support category-A UEs may be similar to that described above with respect to 212.

At 520, the method 500 may include transmitting paging messages to the RAN nodes within the registered tracking area that support category-A UEs.

The RAN nodes that receive the S1-AP paging message may determine whether to transmit paging messages over the radio interfaces in its cells based on a category-A status of each of its cells as described above with respect to the method 400.

The method 500 may be a hybrid approach that combines aspects of method 200 and method 300. The method 500 may have the advantage of reducing S1-AP paging messages over the S1 interface as well as potentially reducing paging messages over the radio interface in the cells of the RAN nodes.

Figure 6:
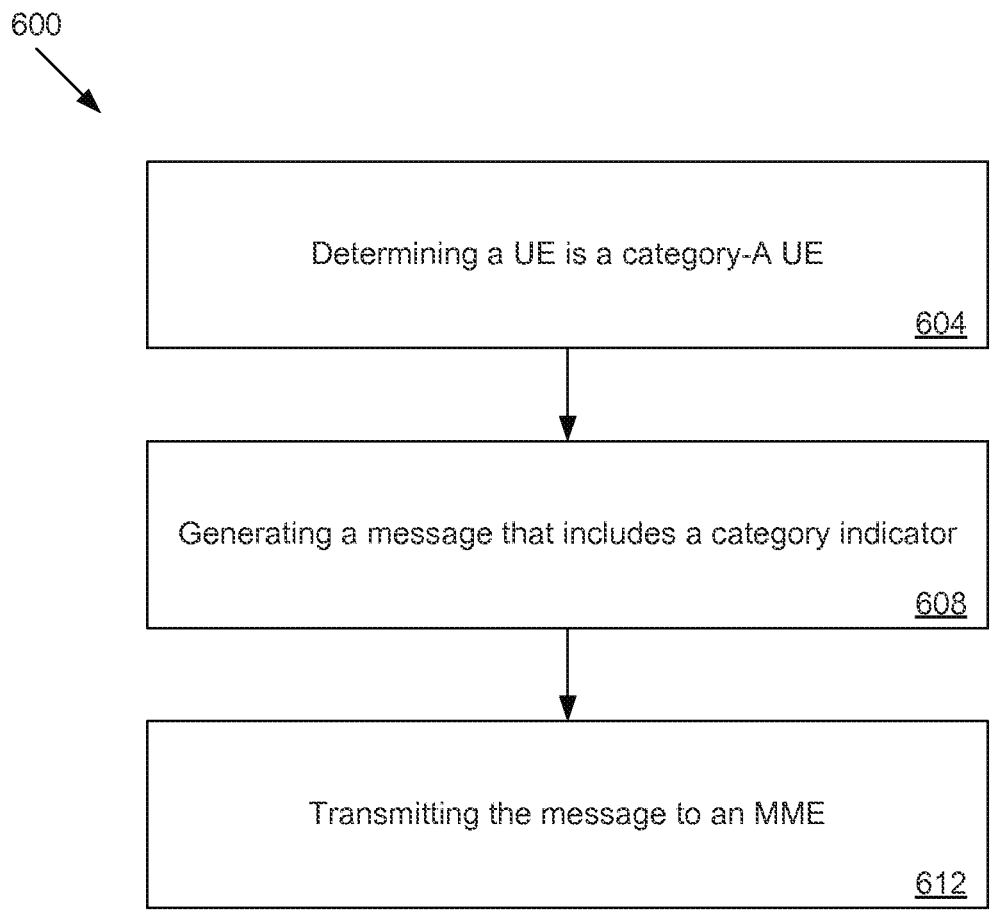
FIG. 6 is a flow diagram illustrating another method for paging in accordance with various embodiments.

FIG. 6 is a flowchart illustrating a method 600 for paging in accordance with some embodiments. In some embodiments, the method 600 may be performed by the eNB 108 and, in particular, control circuitry 140. The control circuitry 140 may include one or more non-transitory computer-readable media having instructions, stored thereon, that when executed cause the UE 104 to perform the method 600.

At 604, the method 600 may include determining that a UE is a category-A UE. In some embodiments, the eNB 108 may determine that the UE is a category-A UE by receiving a category indicator from the UE 104. In some embodiments, the category indicator may be received in a message transmitted to the eNB 108 from the UE 104 over the air interface. For example, the message may be a RACH or RRC message as described above with respect to 208.

At 608, the method 600 may include generating a message that includes the category indicator. The message generated at 608 may include an indication IE that includes the indicator as described above with respect to 208. The message with the indicator IE may be an S1-AP message to be transmitted to the MME 112. The indication IE, as described above, may be separate and distinct from the UE radio access capability structure, which may include a duplicate indicator. In some embodiments, the UE radio access capability structure and the indication IE may be transmitted in the same message or in different messages. In some embodiments, the indicator may only be transmitted in the UE radio access capability structure.

At 612, the method 600 may include transmitting the message to the MME 112.

Figure 7:
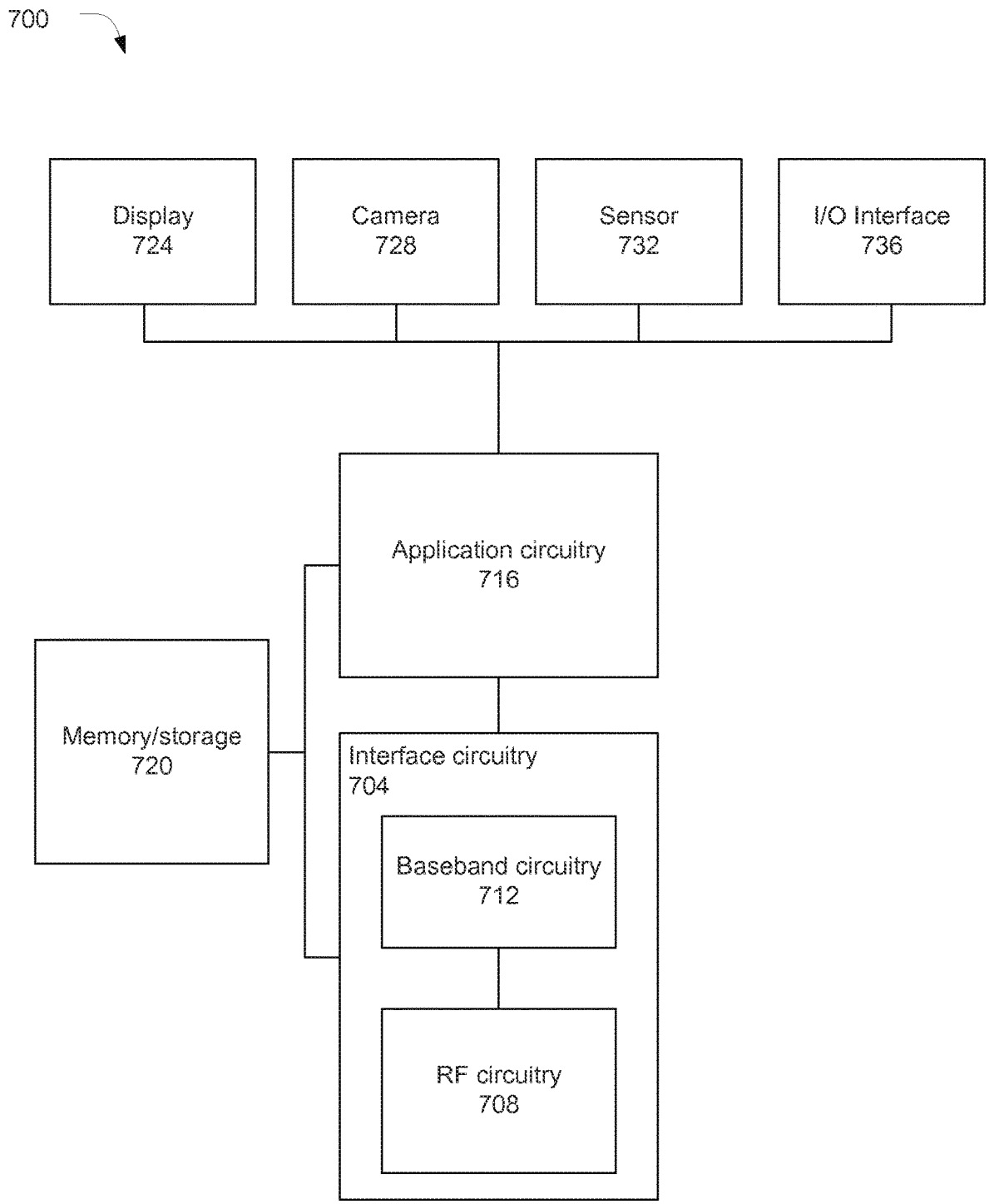
FIG. 7 is a block diagram illustrating a system for paging in accordance with various embodiments.

The UE 104, eNB 108, or MME 112 as described herein may be implemented into a system using any suitable hardware, firmware, and/or software configured as desired. For example, FIG. 7 illustrates, for one embodiment, an example system 700 that may correspond to a UE (for example, UE 104), an eNB (for example, eNB 108), or an MME (for example, MME 112). Additionally, or alternatively, the system 700 may be adapted to perform one or more of the processes described herein (e.g., methods 200, 300, 400, 500, or 600). The system 700 may include interface circuitry 704, which may include RF circuitry 708 and baseband circuitry 712, application circuitry 716, memory/storage 720, display 724, camera 728, sensor 732, and input/output (I/O) interface 736, coupled with each other at least as shown.

The application circuitry 716 may include circuitry such as, but not limited to, one or more single-core or multi-core processors. The processor(s) may include any combination of general-purpose processors and dedicated processors (e.g., graphics processors, application processors, etc.). The processors may be coupled with memory/storage 720 and configured to execute instructions stored in the memory/storage 720 to enable various applications and/or operating systems running on the system 700.

The interface circuitry 704 may handle the signaling protocols and processes desired for transmission and reception of signals over appropriate network interfaces. The interface circuitry 704 may include circuitry such as, but not limited to, one or more single-core or multi-core processors. The processor(s) may include any combination of general-purpose processors and dedicated processors (e.g., baseband processors, communication processors, etc.). The processors may be coupled with memory/storage 720 and configured to execute instructions stored in the memory/storage 720 to enable implementation of various communication protocols.

The baseband circuitry 712 may handle various radio control functions that enable communication with one or more radio networks via the RF circuitry 708. The radio control functions may include, but are not limited to, signal modulation, encoding, decoding, radio frequency shifting, etc. In some embodiments, the baseband circuitry 712 may provide for communication compatible with one or more radio technologies. For example, in some embodiments, the baseband circuitry 712 may support communication with an evolved universal terrestrial radio access network (E-UTRAN) and/or other wireless metropolitan area networks (WMAN), a wireless local area network (WLAN), a wireless personal area network (WPAN). Embodiments in which the baseband circuitry 712 is configured to support radio communications of more than one wireless protocol may be referred to as multi-mode baseband circuitry. In various embodiments, baseband circuitry 712 may include circuitry to operate with signals that are not strictly considered as being in a baseband frequency. For example, in some embodiments, baseband circuitry 712 may include circuitry to operate with signals having an intermediate frequency, which is between a baseband frequency and a radio frequency.

The RF circuitry 708 may enable communication with wireless networks using modulated electromagnetic radiation through a non-solid medium. In various embodiments, the RF circuitry 708 may include switches, filters, amplifiers, etc., to facilitate the communication with the wireless network. In various embodiments, RF circuitry 708 may include circuitry to operate with signals that are not strictly considered as being in a radio frequency. For example, in some embodiments, RF circuitry 708 may include circuitry to operate with signals having the intermediate frequency.

In general, when the system 700 is implemented as the UE 104, the RF circuitry 708 may correspond to the radio transceiver 122; and the baseband circuitry 712 may correspond to the communication circuitry 116 and the control circuitry 120. When the system 700 is implemented as the eNB 108, the RF circuitry 708 may correspond to the transceiver 132; and the baseband circuitry 712 may correspond to the communication circuitry 128 and the control circuitry 140.

In some embodiments, some or all of the constituent components of the interface circuitry 704, the application circuitry 716, or the memory/storage 720 may be implemented together on a system on a chip (SOC).

Memory/storage 720 may be used to load and store data and/or instructions, for example, for system 700. Memory/storage 720 for one embodiment may include any combination of suitable volatile memory (e.g., dynamic random access memory (DRAM)) or non-volatile memory (e.g., Flash memory).

In various embodiments, the I/O interface 736 may include one or more user interfaces designed to enable user interaction with the system or peripheral component interfaces designed to enable peripheral component interaction with the system. User interfaces may include, but are not limited to, a physical keyboard or keypad, a touchpad, a speaker, a microphone, etc. Peripheral component interfaces may include, but are not limited to, a non-volatile memory port, a universal serial bus (USB) port, an audio jack, and a power supply interface.

In various embodiments, sensor 732 may include one or more sensing devices to determine environmental conditions and/or location information related to the system. In some embodiments, the sensor 732 may include, but is not limited to, a gyro sensor, an accelerometer, a proximity sensor, an ambient light sensor, or a positioning unit. The positioning unit may also be part of, or interact with, the interface circuitry 704 to communicate with components of a positioning network, e.g., a global positioning system (GPS) satellite.

In various embodiments, the display 724 may include a display (e.g., a liquid crystal display, a touch screen display, a light-emitting diode display, etc.).

In various embodiments, the system 700 may have more or fewer components, and/or different architectures.

The foregoing description of one or more implementations provides illustration and description, but is not intended to be exhaustive or to limit the scope of the invention to the precise form disclosed. Modifications and variations are possible in light of the above teachings or may be acquired from practice of various implementations of the invention.

Some portions of the preceding detailed description have been presented in terms of algorithms and symbolic representations of operations on data bits within a computer memory. These algorithmic descriptions and representations are the ways used by those skilled in the data processing arts to most effectively convey the substance of their work to others skilled in the arts. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below refer to the action and processes of a computer system, or similar electronic computing device, that manipulates and transforms data represented as physical (electronic) quantities within the computer system's registers and memories into other data similarly represented as physical quantities within the computer system's memories or registers or other such information storage, transmission, or display devices.

Embodiments of the invention also relate to an apparatus for performing the operations herein. Such a computer program is stored in a non-transitory computer-readable medium. A machine-readable medium includes any mechanism for storing information in a form readable by a machine (e.g., a computer). For example, a machine-readable (e.g., computer-readable) medium includes a machine- (e.g., a computer-) readable storage medium (e.g., read only memory (ROM), random access memory (RAM), magnetic disk storage media, optical storage media, flash memory devices).

The processes or methods depicted in the preceding figures can be performed by processing logic that comprises hardware (e.g., circuitry, dedicated logic, etc.), software (e.g., embodied on a non-transitory computer-readable medium), or a combination of both. Although the processes or methods are described above in terms of some sequential operations, it should be appreciated that some of the operations described can be performed in a different order. Moreover, some operations can be performed in parallel rather than sequentially.

Embodiments of the present invention are not described with reference to any particular programming language. It will be appreciated that a variety of programming languages can be used to implement the teachings of embodiments of the invention as described herein. In the foregoing Specification, embodiments of the invention have been described with reference to specific exemplary embodiments thereof. It will be evident that various modifications can be made thereto without departing from the broader spirit and scope of the invention as set forth in the following claims. The Specification and drawings are, accordingly, to be regarded in an illustrative sense rather than a restrictive sense.

Some examples are given below.

Example 1 includes one or more non-transitory, computer-readable media having instructions that, when executed, cause an evolved Node B (eNB) to: determine a user equipment (UE) is associated with a low-complexity category of UEs; generate an information element (IE) to include an indicator that is to indicate that the UE is associated with the low-complexity category of UEs, wherein the IE is separate from a radio capability structure that includes information about radio capabilities of the UE; and transmit the IE to a mobility management entity (MME).

Example 2 includes the one or more non-transitory, computer-readable media of example 1, wherein the indicator is a first indicator and the UE radio capability structure is to include a second indicator to indicate that the UE is associated with the low-complexity category of UEs.

Example 3 includes the one or more non-transitory, computer-readable media of any one of examples 1-2, wherein the eNB is to transmit the radio capability structure to the MME.

Example 4 includes the one or more non-transitory, computer-readable media of example 3, wherein the instructions, when executed, further cause the eNB to: transmit a message including both the IE and the radio capability structure.

Example 5 includes the one or more non-transitory, computer-readable media of example 3, wherein the instructions, when executed, further cause the eNB to: transmit the IE and the radio capability structure in separate messages.

Example 6 includes the one or more non-transitory, computer-readable media of any one of examples 1-5, wherein the instructions, when executed, further cause the eNB to: transmit the IE to the MME in an S1-application protocol (AP) message.

Example 7 includes the one or more non-transitory, computer-readable media of any one of examples 1-6, wherein the instructions, when executed, further cause the eNB to: process a random access channel (RACH) or a radio resource control (RRC) message to determine the UE is associated with the low-complexity category of UEs.

Example 8 includes an apparatus to be employed in an eNB, the apparatus comprising: the one or more non-transitory, computer-readable media of any of examples 1-7; and processing circuitry, coupled with the one or more non-transitory, computer-readable media to execute the instructions.

Example 9 includes an eNB comprising the apparatus of example 8 and further comprising an Ethernet interface to transmit the IE to the MME.

Example 10 includes an apparatus to be employed in mobility management entity (MME), the apparatus comprising: communication circuitry to facilitate communication over an S1 interface; and control circuitry to receive, via the communication circuitry, a first information element (IE) that includes an indicator to indicate that a user equipment (UE) is associated with a low-complexity category of UEs; and receive, via the communication circuitry, a second information element (IE) that is a radio capability structure.

Example 11 includes the apparatus of example 10, wherein the control circuitry is further to store the radio capability structure without accessing information included in the radio capability structure.

Example 12 includes the apparatus of any one of examples 10-11, wherein the radio capability structure includes an indicator to indicate that the UE is associated with the low-complexity category of UEs.

Example 13 includes the apparatus of any one of examples 10-12, wherein the control circuitry is to receive the first and second IEs in a same message.

Example 14 includes an apparatus to be employed in a mobility management entity (MME), the apparatus comprising: one or more computer-readable media to store instructions; and processing circuitry, coupled with the one or more computer-readable media, to execute the instructions to: determine that a paging target is a user equipment (UE) that is associated with a predetermined category; generate an S1-application protocol (AP) paging message to be transmitted to an evolved Node B (eNB) based on said determination that the paging target is a UE that is associated with the predetermined category.

Example 15 includes the apparatus of example 14, wherein the processing circuitry is further to execute the instructions to: determine that the eNB supports UEs associated with the predetermined category; and generate the S1-AP paging message based further on said determination that the eNB supports UEs associated with the predetermined category.

Example 16 includes the apparatus of example 15, wherein the processing circuitry is to determine that the eNB supports UEs associated with the predetermined category based on information received from an operations, administration, and management (OAM) procedure; information received from the eNB via S1-AP signaling; or information received from a network database.

Example 17 includes the apparatus of any one of examples 14-16, wherein the predetermined category is a low-complexity category.

Example 18 includes the apparatus of example 17, wherein the low-complexity category is a category 0.

Example 19 includes the apparatus of any one of examples 14-18, further comprising: storage circuitry to: store a radio capability structure that includes information about radio capabilities of the UE; and store, separate from the radio capability structure, an information element (IE) that includes an indicator that the UE is associated with the predetermined category.

Example 20 includes the apparatus of any one of examples 14-19, wherein the processing circuitry is to determine that the paging target is a UE that is associated with the predetermined category based on UE subscription data received from a home subscriber server (HSS), a home location register (HLR), or an authentication, accounting, and authorization (AAA) server.

Example 21 includes the apparatus of any one of examples 14-20, wherein the processing circuitry is to generate the S1-AP paging message with an indication that the paging target is associated with the predetermined category.

Example 22 includes the apparatus of example 21, wherein the processing circuitry is to transmit the S1-AP paging message to a plurality of eNBs of a tracking area, the plurality of eNBs including the eNB.

Example 23 includes an apparatus to be employed by an evolved Node B (eNB), the apparatus comprising: communication circuitry to communicate paging messages with one or more network components; and control circuitry, coupled with the communication circuitry, the control circuitry to: process an S1-application protocol (AP) paging message, received by the communication circuitry, directed to a target; determine that the target is a user equipment (UE) associated with a predetermined category; determine one or more cells provided by the eNB supports UEs associated with the predetermined category; and page the UE, using the communication circuitry, in the one or more cells.

Example 24 includes the apparatus of example 23, wherein the control circuitry is to determine that the target is associated with a predetermined category based on an indicator in the S1-AP paging message.

Example 25 includes the apparatus of any one of examples 23-24, wherein the control circuitry is to determine that the target is associated with the predetermined category based on an identity of a source of the S1-AP paging message.

Example 26 includes a mobility management entity (MME) comprising: first circuitry to detect that an S1-AP paging message target is a user equipment (UE) that is associated with a predetermined category; second circuitry to determine that an enhanced Node B (eNB) supports UEs associated with the predetermined category; and third circuitry, coupled with the first and second circuitries, to send an S1-AP paging message to the eNB based on said detection that the S1-AP paging message target is a UE that is associated with a predetermined category and determination that the eNB supports UEs associated with the predetermined category.

Example 27 includes the MME of example 26, further comprising: storage circuitry to store UE radio access capabilities, wherein the first circuitry is to detect that the S1-AP paging message target is a UE that is associated with the predetermined category based on the UE radio access capabilities.

Example 28 includes the MME of example 26, wherein the first circuitry is to detect that the S1-AP paging message target is a UE that is associated with the predetermined category based on UE subscription data in HSS/HLR/AAA.

Example 29 includes the MME of any one of examples 26-28, wherein the second circuitry is to identify eNBs supporting UEs associated with the predetermined category.

Example 30 includes the MME of example 29, wherein the second circuitry is to be pre-provisioned with information regarding eNB support for UEs associated with the predetermined category via OAM.

Example 31 includes the MME of example 29, wherein the second circuitry is to receive information regarding eNB support for UEs with the predetermined category from the eNB via S1-AP signaling.

Example 32 includes the MME of example 26, wherein the predetermined category is a low-cost category, a low-complexity category, or a category 0.

Example 33 includes an evolved Node B (eNB) comprising: first circuitry to receive an S1-AP paging message directed to a target; and second circuitry to detect that the target is a user equipment (UE) associated with a predetermined category and to forward said paging message via an air interface if the eNB supports UEs associated with the predetermined category.

Example 34 includes the eNB of example 33, further comprising: third circuitry to send to a mobility management entity (MME) indication regarding eNB support for UEs associated with the predetermined category.

Example 35 includes the eNB of example 33, wherein the second circuitry is to check a predetermined category information element within the S1-AP paging message to detect that the target is a UE associated with the predetermined category.

Example 36 includes the eNB of any one of examples 33-35, wherein the predetermined category is a low-cost category, a low-complexity category, or category 0.

Example 37 includes a method comprising: determining a user equipment (UE) is associated with a low-complexity category of UEs; generating an information element (IE) to include an indicator that is to indicate that the UE is associated with the low-complexity category of UEs, wherein the IE is separate from a radio capability structure that includes information about radio capabilities of the UE; and transmitting the IE to a mobility management entity (MME).

Example 38 includes the method of example 37, wherein the indicator is a first indicator and the UE radio capability structure is to include a second indicator to indicate that the UE is associated with the low-complexity category of UEs.

Example 39 includes the method of example 36 or 37, wherein the eNB is to transmit the radio capability structure to the MME.

Example 40 includes the method of example 39, further comprising: transmitting a message including both the IE and the radio capability structure.

Example 41 includes the method of example 39, further comprising: transmitting the IE and the radio capability structure in separate messages.

Example 42 includes the method of any one of examples 37-41, further comprising: transmitting the IE to the MME in an S1-application protocol (AP) message.

Example 43 includes the method of any one of examples 37-42, wherein the instructions, when executed, further cause the eNB to: process a random access channel (RACH) or a radio resource control (RRC) message to determine the UE is associated with the low-complexity category of UEs.

Example 44 includes a method comprising: receiving a first information element (IE) that includes an indicator to indicate that a user equipment (UE) is associated with a low-complexity category of UEs; and receiving a second information element (IE) that is a radio capability structure.

Example 45 includes the method of example 44, further comprising: storing the radio capability structure without accessing information included in the radio capability structure.

Example 46 includes the method of example 44 or 45, wherein the radio capability structure includes an indicator to indicate that the UE is associated with the low-complexity category of UEs.

Example 47 includes the method of any one of examples 44-46, further comprising: receiving the first and second IEs in a same message.

Example 48 includes a method comprising: determining that a paging target is a user equipment (UE) that is associated with a predetermined category; generating an S1-application protocol (AP) paging message to be transmitted to an evolved Node B (eNB) based on said determination that the paging target is a UE that is associated with the predetermined category.

Example 49 includes the method of example 48, further comprising: determining that the eNB supports UEs associated with the predetermined category; and generating the S1-AP paging message based further on said determining that the eNB supports UEs associated with the predetermined category.

Example 50 includes the method of example 49, further comprising: determining that the eNB supports UEs associated with the predetermined category based on information received from an operations, administration, and management (OAM) procedure; information received from the eNB via S1-AP signaling; or information received from a network database.

Example 51 includes the method of any one of examples 48-50, wherein the predetermined category is a low-complexity category.

Example 52 includes the method of example 51, wherein the low-complexity category is a category 0.

Example 53 includes the method of any one of examples 48-52, further comprising: storing a radio capability structure that includes information about radio capabilities of the UE; and storing, separate from the radio capability structure, an information element (IE) that includes an indicator that the UE is associated with the predetermined category.

Example 54 includes the method of any one of examples 48-53, further comprising: determining that the paging target is a UE that is associated with the predetermined category based on UE subscription data received from a home subscriber server (HSS), a home location register (HLR), or an authentication, accounting, and authorization (AAA) server.

Example 55 includes the method of any one of examples 48-54, further comprising: generating the S1-AP paging message with an indication that the paging target is associated with the predetermined category.

Example 56 includes the method of any one of examples 48-55, further comprising: transmitting the S1-AP paging message to a plurality of eNBs of a tracking area, the plurality of eNBs including the eNB.

Example 57 includes a method comprising: processing an S1-application protocol (AP) paging message, received by communication circuitry, directed to a target; determining that the target is a user equipment (UE) associated with a predetermined category; determining one or more cells provided by the eNB supports UEs associated with the predetermined category; and paging the UE in the one or more cells.

Example 58 includes the method of example 57, further comprising: determining that the target is associated with a predetermined category based on an indicator in the S1-AP paging message.

Example 59 includes the method of example 57 or 58, further comprising: determining that the target is associated with the predetermined category based on an identity of a source of the S1-AP paging message.

Example 60 includes an apparatus having means to perform the method of any one of examples 37-59.

Example 61 includes one or more non-transitory, computer-readable media having instructions that, when executed, perform the method of any one of examples 44-59.

Example 62 includes an apparatus to be employed in an evolved Node B (eNB), the apparatus comprising: control circuitry to: determine a user equipment (UE) is associated with a low-complexity category of UEs; and generate an information element (IE) to include an indicator that is to indicate that the UE is associated with the low-complexity category of UEs, wherein the IE is separate from a radio capability structure that includes information about radio capabilities of the UE; and communication circuitry to transmit the IE to a mobility management entity (MME).

Example 63 includes the apparatus of example 62, wherein the indicator is a first indicator and the UE radio capability structure is to include a second indicator to indicate that the UE is associated with the low-complexity category of UEs.

Example 64 includes the apparatus of example 62 or 63, wherein the control circuitry is to transmit, via the communication circuitry, the radio capability structure to the MME.

Example 65 includes the apparatus of example 64, wherein the control circuitry is to: transmit, via the communication circuitry, a message including both the IE and the radio capability structure.

Example 66 includes the apparatus of example 64, wherein the control circuitry is to: transmit, via the communication circuitry, the IE and the radio capability structure in separate messages.

Example 67 includes the apparatus of any one of examples 62-66, wherein the control circuitry is to: transmit, via the communication circuitry, the IE to the MME in an S1-application protocol (AP) message.

Example 68 includes the apparatus of any one of examples 62-67, wherein the control circuitry is to: process a random access channel (RACH) or a radio resource control (RRC) message to determine the UE is associated with the low-complexity category of UEs.

What is claimed is:

1. One or more non-transitory, computer-readable media having instructions that, when executed, cause an access node to:
   determine that a user equipment (UE) is a category-0 UE;
   generate, by the access node for sending to a mobility management entity (MME), a message that includes:
   an information element (IE) with a first category indicator that is to indicate that the UE is a category-0 UE and a service indicator to provide information related to procedures to be used when paging the UE, and
   a radio capability structure, which is separate from the IE and includes (i) information about radio capabilities of the UE, and (ii) a second category indicator to indicate that the UE is a category-0 UE; and
   transmit the message to the MME.

2. The one or more non-transitory, computer-readable media of claim 1, wherein the instructions, when executed, further cause the access node to:
   transmit the IE to the MME in an S1-application protocol (AP) message.

3. The one or more non-transitory, computer-readable media of claim 1, wherein the instructions, when executed, further cause the access node to:
   process a random access channel (RACH) or a radio resource control (RRC) message to determine the UE is associated with a low-complexity category of UEs.

4. The one or more non-transitory, computer-readable media of claim 1, wherein the service indicator is to provide information related to coverage enhancement procedures to be used when paging the UE.

5. The one or more non-transitory, computer-readable media of claim 1, wherein the instructions further cause the access node to:
   decode an S1-AP paging message received from the MME, the S1-AP paging message including the IE to indicate that the UE is a category-0 UE.

6. An apparatus to be employed in an access node, the apparatus comprising:
   processing circuitry; and
   one or more non-transitory, computer-readable media comprising instructions that, upon execution of the instructions by the processing circuitry, are to cause the access node to:
   determine that a user equipment (UE) is a category-0 UE;
   generate, by the access node for sending to a mobility management entity (MME),
   a message that includes:
   an information element (IE) with a first category indicator that is to indicate that the UE is a category-0 UE and a service indicator to provide information related to procedures to be used when paging the UE, and
   a radio capability structure, which is separate from the IE and includes (i) information about radio capabilities of the UE, and (ii) a second category indicator to indicate that the UE is a category-0a UE; and
   transmit the message to the MME.

7. The apparatus of claim 6, wherein the access node further comprises an Ethernet interface to transmit the IE to the MME.

8. The apparatus of claim 6, wherein the instructions, when executed, are further to cause the access node to transmit the IE to the MME in an S1-application protocol (AP) message.

9. The apparatus of claim 6, wherein the instructions, when executed, are further to cause the access node to process a random access channel (RACH) or a radio resource control (RRC) message to determine the UE is associated with a low-complexity category of UEs.

10. The apparatus of claim 6, wherein the service indicator is to provide information related to coverage enhancement procedures to be used when paging the UE.

11. The apparatus of claim 6, wherein the instructions, when executed, are further to cause the access node to decode an S1-AP paging message received from the MME, the S1-AP paging message including the IE to indicate that the UE is a category-0 UE.

12. A method comprising:
processing, by a mobility management entity (MME), a message to determine a first information element (IE) that includes a first category indicator to indicate that a user equipment (UE) is a category-0 UE, and a service indicator to provide information related to procedures to be used when paging the UE; and
processing, by the MME, the message to determine a second IE that is a radio capability structure, where the first IE is separate from the second IE and where the second IE includes a second category indicator to indicate that the UE is a category-0 UE.

13. The method of claim 12, wherein the service indicator is to provide information related to coverage enhancement procedures to be used when paging the UE.

14. The method of claim 12, further comprising storing, by the MME, the radio capability structure without accessing the second category indicator included in the radio capability structure.

15. The method of claim 12, wherein the message processed by the MME includes an S1-AP message received from an access node.

16. An apparatus to be employed in mobility management entity (MME), the apparatus comprising:
first circuitry to process a message to determine a first information element (IE) that includes a first category indicator to indicate that a user equipment (UE) is a category-0 UE, and a service indicator to provide information related to procedures to be used when paging the UE; and
second circuitry to process the message to determine a second information element (IE) that is a radio capability structure, wherein the second IE is separate from the first IE and wherein the second IE includes a second category indicator to indicate that the UE is a category-0 UE.

17. The apparatus of claim 16, further comprising processing circuitry to store the radio capability structure without accessing the second category indicator included in the radio capability structure.

18. The apparatus of claim 16, wherein the service indicator is to provide information related to coverage enhancement procedures to be used when paging the UE.

19. The apparatus of claim 16, wherein the message processed by the MME includes an S1-AP message received from an access node.

20. The apparatus of claim 16, wherein the first circuitry and the second circuitry are elements of communication circuitry of the MME.

21. One or more non-transitory, computer-readable media having instructions that, when executed, cause a mobility management entity (MME) to:
process a message to determine a first information element (IE) that includes a first category indicator to indicate that a user equipment (UE) is a category-0 UE, and a service indicator to provide information related to procedures to be used when paging the UE; and
process the message to determine a second IE that is a radio capability structure, where the first IE is separate from the second IE and where the second IE includes a second category indicator to indicate that the UE is a category-0 UE.

22. The one or more non-transitory, computer-readable media of claim 21, wherein the service indicator is to provide information related to coverage enhancement procedures to be used when paging the UE.

23. The one or more non-transitory, computer-readable media of claim 21, wherein the instructions further cause the MME to store the radio capability structure without accessing the second category indicator included in the radio capability structure.

24. The one or more non-transitory, computer-readable media of claim 21, wherein the message processed by the MME includes an S1-AP message received from an access node.

* * * * *

UNITED STATES PATENT AND TRADEMARK OFFICE
CERTIFICATE OF CORRECTION

PATENT NO. : 10,863,476 B2  
APPLICATION NO. : 15/126560  
DATED : December 8, 2020  
INVENTOR(S) : Marta Martinez Tarradell et al.

Page 1 of 1

It is certified that error appears in the above-identified patent and that said Letters Patent is hereby corrected as shown below:

In the Claims

Column 20, Line 51, in Claim 6, delete "category-0a" and insert -- category-0 --.

Signed and Sealed this  
Twenty-fourth Day of August, 2021

Drew Hirshfeld  
*Performing the Functions and Duties of the*  
*Under Secretary of Commerce for Intellectual Property and*  
*Director of the United States Patent and Trademark Office*